United States Patent [19]

Wressell

[11] 4,166,327

[45] Sep. 4, 1979

[54] COORDINATION PRACTICE DEVICE

[76] Inventor: Charles Wressell, 115 Alexandra Ter., Lincoln, England

[21] Appl. No.: 846,531

[22] Filed: Oct. 28, 1977

[51] Int. Cl.² .............................................. G09B 9/04
[52] U.S. Cl. .................................. 35/11 R; 35/22 R; 273/110
[58] Field of Search ............... 35/11 R, 22 R; 273/110

[56] References Cited

U.S. PATENT DOCUMENTS

| 1,502,365 | 7/1924 | Wilson | 2 73/110 |
| 2,046,202 | 6/1936 | Miles | 35/11 R |
| 3,643,952 | 2/1972 | Sprowl | 273/110 |
| 3,811,676 | 5/1974 | Greenberg | 273/110 |

FOREIGN PATENT DOCUMENTS

| 513740 | 9/1952 | Belgium | 273/110 |
| 603169 | 3/1960 | Italy | 273/110 |

*Primary Examiner*—William H. Grieb
*Attorney, Agent, or Firm*—Cushman, Darby & Cushman

[57] ABSTRACT

A coordination-practice device comprising a table mounted for tilting movement about a horizontal axis and for rotation about an axis perpendicular to its surface, the movements being simultaneously and independently effected by movement of respective controls operable by an operator to control the motion of an object along a path defined on the table surface. The rotation is controllable by a manually operable wheel and the tilting either by a manual control or by two independent, foot-operable pedals, the use of which simulates the simultaneous use of the clutch and accelerator pedals of a motor vehicle.

9 Claims, 5 Drawing Figures

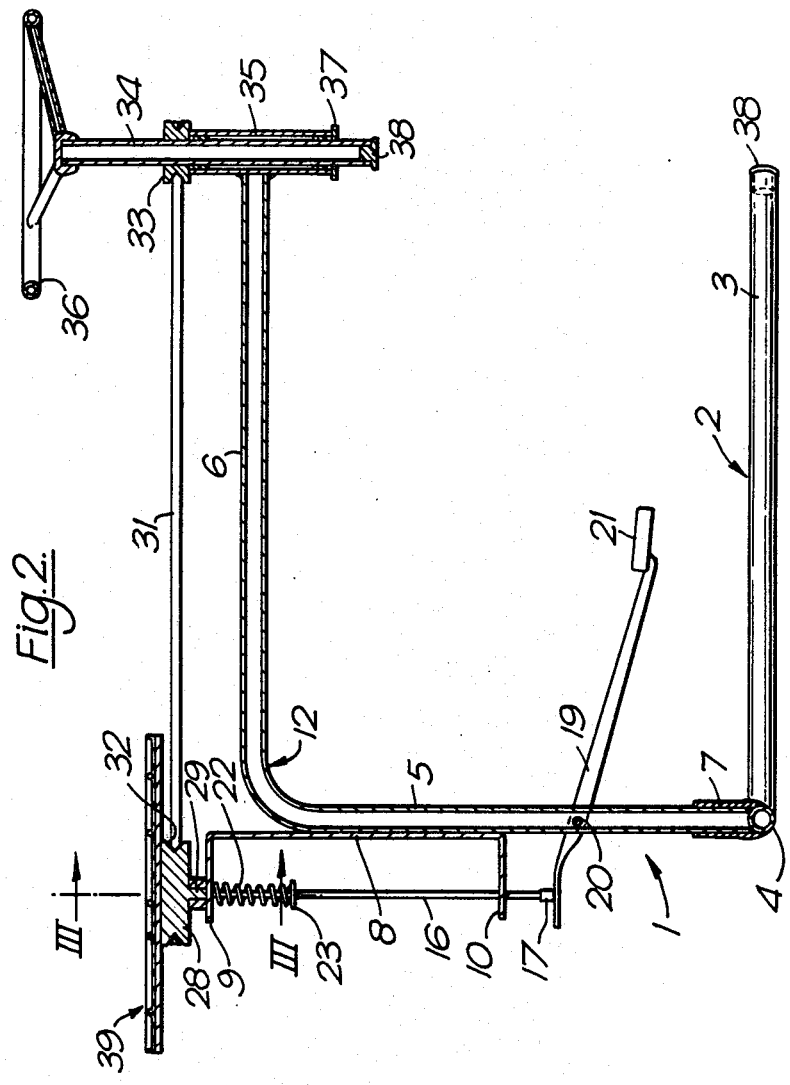

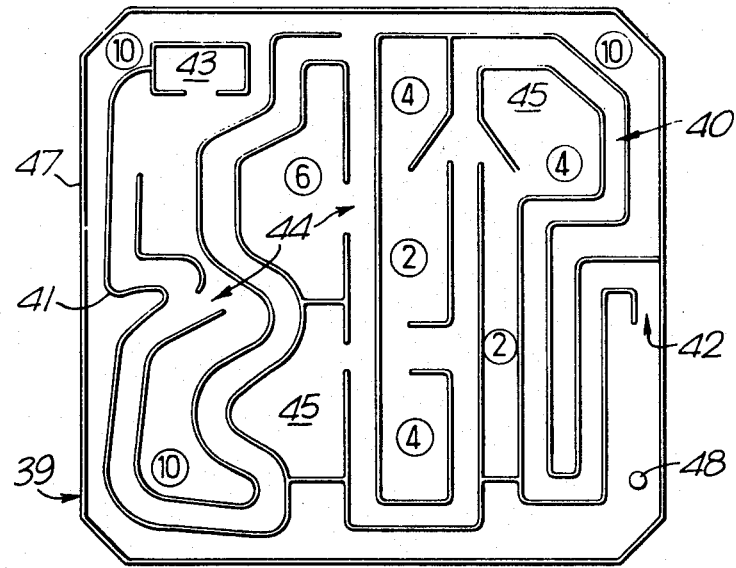
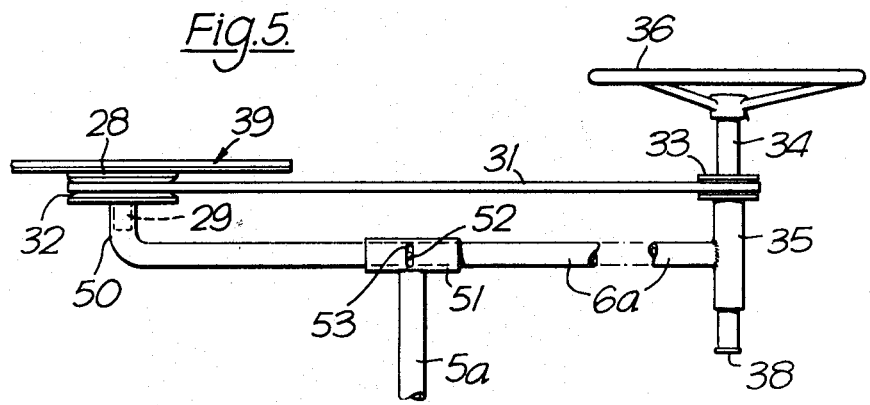

COORDINATION PRACTICE DEVICE

BACKGROUND OF THE INVENTION

The present invention relates to a coordination practice device and particularly to such a device having two controls by means of which an operator can control the movement of a movable member.

It is known that young children need to spend a good deal of time in learning to coordinate their movements and find particular difficulty in performing different movements with both hands or feet simultaneously. Even in later life many people find diffficulty in performing such movements smoothly as becomes apparent, for example, when they first learn to drive an automobile.

OBJECTS OF THE INVENTION

An object of the present invention is, therefore, to provide a coordination practice device, use of which can develop the control of simultaneous movements of the hands and/or feet and which can be used as part of a game which can be set up in the home and will therefore entice children to use it. A further object of the invention is to provide such a device which can be used in the home by a person wishing to learn to drive an automobile and which can give practice useful, for example, for clutch control without the anxieties and dangers attendant on learning such control on the roads.

SUMMARY OF THE INVENTION

According to the present invention there is provided a coordination practice device comprising a base, a rotatable table carried by the base and independently operable control devices for effecting, respectively, rotation of said table about an axis perpendicular to the table and tilting of said table about an axis substantially perpendicular to said axis of rotation, each said control being movable over a continuous range to effect corresponding rotation or tilting of said table so that the orientation of the surface of the table is determined by both control devices.

The axis of tilting of the table is preferably substantially horizontal, the axis of rotation pivoting in a vertical plane substantially perpendicular to the axis of tilting as the table is tilted about the latter.

Preferably the table can be tilted through an angle of up to a maximum of 30° in either direction from a position in which the surface of the table is substantially horizontal.

The table preferably has a substantially flat upper surface and a device according to the invention preferably also includes a movable object, such as a model car or a ball, which can be placed on the flat surface for sliding or rolling movement along it. Tilting of the table and hence of the flat surface out of a horizontal plane will cause the movable object to slide or roll at a speed dependent on the degree of tilt, while rotation of the surface will change the direction of movement of the object relative to the surface. An operator using the device can therefore control the movement of a movable object on the surface by careful and simultaneous operation of the controls, thereby gaining the desired coordination practice.

Preferably the flat upper surface is provided with a path, defined for example by painted lines or raised edges, along which the movable object can be maneuvered by careful operation of the controls. Maneuvering the object along the path can then be made the subject of a game.

The table may be rotated in any convenient way, for example, by means of a drive shaft arranged to be driven to rotate by a foot or hand operated lever, but in preferred embodiments of the invention the control device for effecting rotation of the table comprises a flexible drive belt engaged in a circumferential groove in a pulley attached to, or incorporated in, the table and driven by a pulley which is rotatable by a drive shaft provided with a manually operable wheel. Rotation of the wheel by an operator can thus simulate rotation of the steering wheel of a motor vehicle.

In one embodiment of the invention the table and the drive shaft are carried at either end of a substantially horizontal arm, rotatably mounted from the base for rotation about its longitudinal axis which constitutes the tilt axis of the table, such that pivotal movement of the drive shaft about the said longitudinal axis, in either sense, is transmitted by the arm to tilt the table. The wheel attached to the drive shaft thus constitutes the control both for rotation and tilting of the table. It is envisaged that this device will be of particular use for handicapped persons, without the use of their legs, in order to develop manaul control and dexterity.

In an alternative embodiment of the invention, independent hand or foot operated tilt-control devices are provided which act on the table simultaneously to apply opposite turning moments to the table with respect to the tilt axis. By balancing the forces applied to the two tilt controls simultaneously, and hence the moment applied to the table, an operator can, with practice, adjust the tilt of the table much more precisely with the dual tilt control devices than with a single tilt control device.

The controls of the tilt control devices are preferably both foot-operated, the control of the control device for rotation of the table, which may be of any convenient type but preferably includes a drive belt and pulley as described above, being manually operable. The controls are preferably so located that an operator can sit at the device to operate each of the foot controls and the manual control simultaneously.

The said tilt control devices may, for example, comprise ropes or wires attached to the underside of the table, on opposite sides of its axis of rotation and provided with foot stirrups, but in a preferred embodiment of the invention each tilt control device includes a substantially vertical push-rod, each of the rods acting on an under surface of the table, one on either side of the axis of rotation of the table to apply opposite turning moments to the table. The rods are preferably connected to foot operable pedals.

The control of such foot-operable pedals can give practice useful for the simultaneous use of the clutch and accelerator pedals of an automobile. Further, the combination of the operation of the foot-pedals and the manually operable wheel can give practice in the clutch control combined with steering control required for a three-point turn.

The base of a device according to the present invention preferably comprises a tubular framework which is preferably formed in releasably engageable parts. The various parts of the device such as the table, manually operable wheel and possibly also the foot-pedals are preferably also releasably engageable with the framework so that the device may be taken apart for storage.

BRIEF DESCRIPTION OF THE DRAWINGS

Two embodiments of the invention will now be described, by way of example, with reference to the accompanying purely diagrammatic drawings, in which:

FIG. 2 is a sectional view on a larger scale of the device of FIG. 1;

FIG. 4 is a plan view of a board forming part of the device of FIG. 1, and

FIG. 5 is a side elevational view of part of a device according to a second embodiment of the invention.

DESCRIPTION OF THE PREFERRED EMBODIMENTS

Figure 1:
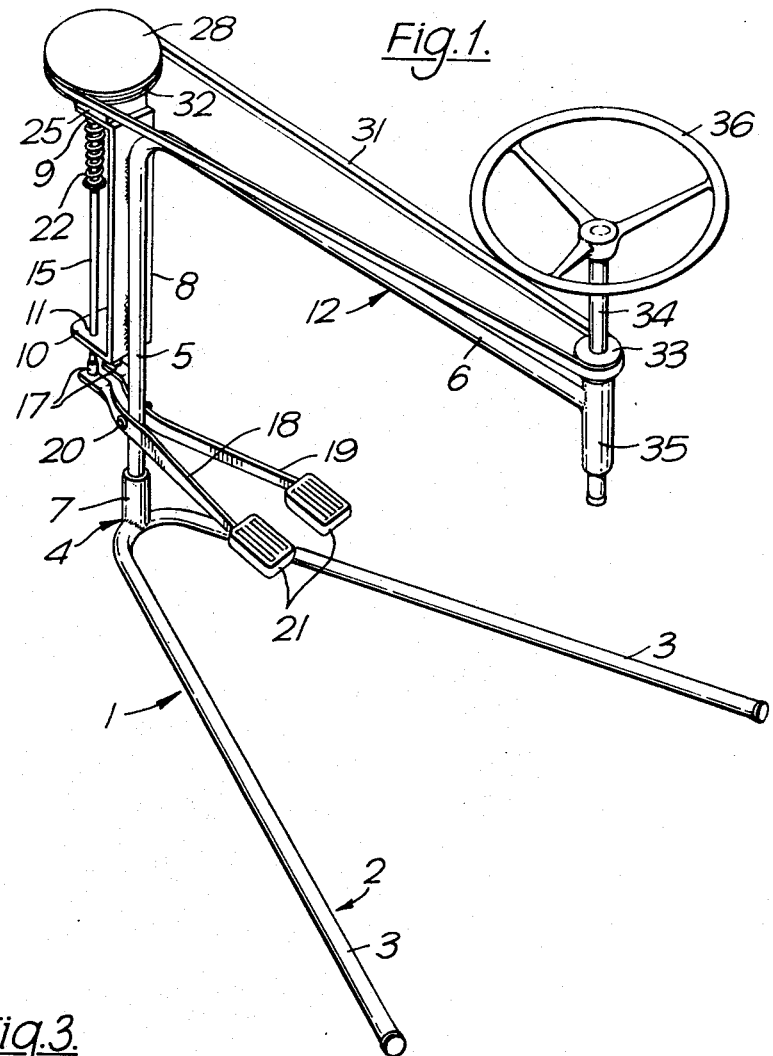
FIG. 1 is a perspective view of a coordination practice device according to a first embodiment of the invention.
Figure 3:
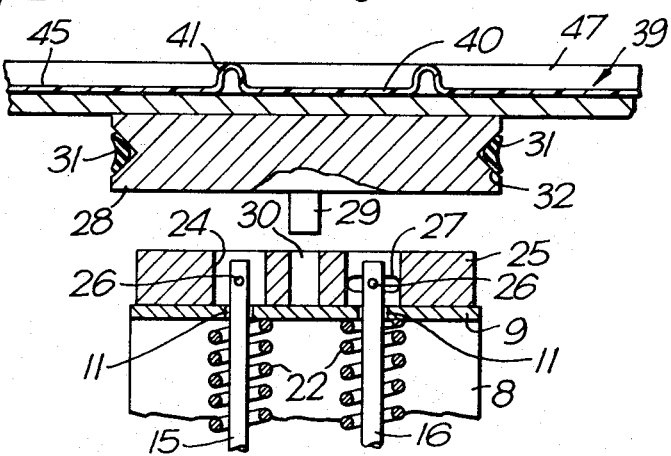
FIG. 3 is a cross-sectional view on a larger scale of part of the device of FIGS. 1 and 2 taken on line III—III of FIG. 2, showing parts of the device separated.

Referring to FIGS. 1 to 3 of the drawing, a coordination practice device according to the invention is shown generally indicated 1.

The device 1 has a tubular metal framework of ½ inch external-diameter tubing including a "V"-shaped support member 2, having two arms 3, each approximately 15 inches long, which diverge forwardly of the device from an apex 4. The member 2 is shown resting on a horizontal surface to support the device 1 in use.

The framework includes a further frame member 12 having two arms 5, 6, approximately 9 inches and 12 inches long respectively, bent substantially at a right angle to each other. The free end of the arm 5 is releasably engaged in a sleeve 7 extending upwardly from, and welded to, the apex 4 of the support member 2 such that the arm 5 is substantially vertical and the arm 6 extends forwardly between and above the arms 3 of the member 2. The arm 5 is secured in the sleeve 7 by a self-tapping screw (not shown) located in corresponding throughbores in the arm 5 and the sleeve 7.

The upper part of the arm 5 carries a bracket 8 comprising a rectangular base member which extends along the rear side of the arm 5 and is spot-welded to it and rearwardly extending rectangular lugs 9, 10 carried at the upper and lower ends of the base member respectively. The upper lug 9 is slightly above the level of the arm 6 and the lower lug 10 is approximately midway along the arm 5. Each lug 9, 10 has two throughbores 11, the vertically separated pairs of which serve to locate and guide push rods 15, 16 respectively for vertical sliding movement relative to the arm 5 of the framework.

The lower end of each push rod 15, 16 is provided with a plastic tip 17 which rests on the rear end of a respective lever 18, 19. The levers 18, 19 extend on either side of the arm 5 and are pivotally mounted for rotation about a substantially horizontal axis from the said arm by means of a bolt 20 secured by a nut. The front end of each lever 18, 19 is provided with a foot pedal 21 such that pressure on a pedal 21 causes the respective lever to rotate about the bolt 20 to force the respective push-rod 15 or 16 resting on the respective rear end to move vertically upwardly, guided by the throughbores 11 in the lugs 9, 10. A compression spring 22 is mounted coaxially with each push rod 15, 16 between a locking washer 23 attached to the respective rod and the upper lug 9 to oppose and limit upward movement of the respective rod.

The upper end of each rod 15, 16 extends into a respective cavity 24 in a square-section pivot block 25 located above the lug 9, the block 25 being supported by two pivot pins 26 each located with its axis substantially horizontal in a respective throughbore near the upper end of one of the rods 15, 16 and in a corresponding pivot hole 27 in the block 25. The cavities 24 are elongate in the plane containing the longitudinal axes of the rods 15, 16 and one of the pivot holes 27 is elongate in a horizontal plane in the neutral position of the device as shown, to allow pivotal movement of the block 25 when one of the rods 15, 16 is forced upwards by pressure on the respective corresponding pedal 21.

The upper surface of the pivot block 25 supports a turntable 28 rotatably mounted by means of a spigot 29 located in a cooperating throughbore 30 in the block 25 for rotation about an axis substantially parallel to, and midway between, the longitudinal axes of the rods 15, 16 in the neutral position of the block 25 in which the upper surface of the block is horizontal.

The turntable 28 incorporates a pulley, being provided with a circumferential groove 33, and is rotatable by means of a flexible endless belt 31 engaged in the groove 32. The belt 31 is also engaged in the groove of a 2 inch-diameter pulley 33 carried by a substantially vertical drive shaft 34 rotatably mounted in a vertical sleeve 35 welded to the front end of the arm 6 of the framework. The upper end of the drive shaft 34 is provided with a manually rotatable wheel 36 releasably engaged with the drive shaft 34 and secured by a self-tapping screw (not shown).

The drive shaft 34 is retained in position in the sleeve 35 by means of a washer 37 and self-tapping screw (not shown) adjacent its lower end. The lower end of the drive shaft and also the free ends of the arms 3 of the frame member 2 are closed by respective plastic caps 38.

All the bearing surfaces of the device 1 are provided with plastics bushes or washers (not shown).

The turntable 28 carries an approximately 18 inch square board 39 of vacuum-formed plastics material which is glued to its upper surface. The board 39 provides a game for use with the device 1, as best seen in FIG. 4.

The upper surface of the board 39 is substantially flat but is provided with a winding path 40, defined by ¼ inch high raised edges 41, having a starting point 42 and finishing box 43. Breaks 44 are provided in the edges of the path 40 to allow access to spaces 45 between the arms of the path. Each space 45 is marked with a number chosen partly in accordance with the ease of access from the path to the space. The board 39 is provided with a raised edge 47 to prevent an object such as a ball 48 placed on the board, from rolling off.

In use of the device 1, an object such as a ball 48 is placed on the board 39 at the starting point 42 of the path 40. An operator would sit in front of the device so that he could control the pedals 21 with his feet and the steering wheel 36 with his hands. By pressing on the pedals 21 the operator may change the tilt of the board 39 to start the ball rolling and to control its speed of movement, while by turning the wheel 36 he may vary the direction in which the ball rolls relative to the surface of the board 39.

The object of the game is for each player to guide the ball 48 along the path 40 from the starting point 42 to the finishing box 43 without allowing it to roll into a space 45. If the ball does roll into a space 45, a penalty is incurred according to the number marked in that space, all the penalties being added up for a particular journey. The player with the smallest number of penalty points is the winner of the game.

When not in use the device 1 may be dismantled, the frame member 12 being disengaged from the frame member 2 and the turntable 28 with the board 39 attached being removed from the pivot block 25. The wheel 36 and pedals 19, 20 may also be removed and the whole device may be stored in a box, approximately 20 inches square by 4 inches deep.

In addition to the pedals and wheel shown, other controls simulating the direction indicator or brake controls of an automobile may also be provided. Also a number of boards could be made with paths of varying difficulty for use by people of widely differing age groups.

Whereas for clutch control practice, operation of both pedals 21 simultaneously is required, the game could also be very beneficial for handicapped people as, in fact, only one pedal 21 need be operated to tilt the board 39 although the degree of control would in this case be restricted.

Referring to FIG. 5 of the drawings, a second embodiment of a device according to the invention is shown in which features similar to those of FIGS. 1-4 are designated by the same numerals.

The device of FIG. 5 is adapted for purely manual operation by means of a manually operable wheel 36 which is arranged to drive a turntable 28 to rotate about its axis by means of a drive shaft 34, pulley 33 and a flexible belt 31 as in the first embodiment of the invention described above.

In this embodiment, however, the spigot 29 of the turntable 28 is located in the open end of an upwardly turned portion 50 of a tubular arm 6a, at the opposite end of which is carried the drive shaft 34 rotatably mounted in a sleeve 35 as in the previous embodiment. No pivot block 25, push rods 16, 17 or levers 18, 19 and associated foot pedals 21 are provided. The arm 6a is rotatably mounted for rotation about its longitudinal axis, which is substantially horizontal and which constitutes a tilt axis of the turntable 28, in a sleeve 51 welded to the upper end of a vertical frame member 5a.

Pivotal movement of the drive shaft 34 about the axis of the arm 6a in either sense, caused by operation on the wheel 36, is thus transmitted through rotation of the arm 6a to pivot the end portion 50 and hence tilt the turntable 28 in the same sense. Rotation of the arm 6a is restricted by means of a peg 52 carried by the arm 6a, which is located in an opening 53 in the sleeve 51. The opening 53 is of such a length, circumferentially of the sleeve 51, that it allows rotation of the arm 6a about its axis through an angle of 30° on either side of a position in which the upper surface of the turntable 28 is substantially horizontal.

The lower end (not shown) of the member 5a can be engaged in the sleeve 7 carried by the "V"-shaped support member 2 of the device of FIGS. 1 to 4 to support the device as in the previous embodiment.

The turntable 28 supports a board 39 as described with reference to FIG. 4.

I claim:

1. A driving practice device, comprising:
a base,
a table carried by the base and having a flat upper surface, said table being tiltable about a substantially horizontal axis and rotatable about an axis substantially perpendicular to the table;
a manually operable steering wheel carried by said base and connected to said table such that the manual rotation of said wheel effects rotation of said table about said axis;
two substantially vertical push-rods which act on an under-surface of said table, one on either side of said axis of rotation of the table, to apply opposite turning moments to said table;
two foot-operable levers pivotally carried by said base, one end of each of which acts on a respective push-rod to force it upwards in response to pressure on the opposite end of said lever, to tilt said table; and
a movable object which can be placed on said flat upper surface for sliding or rolling movement along it, operation of said steering wheel and said foot-operable levers to rotate and tilt said table controlling the speed and direction of movement of said object relative to said surface.

2. A driving practice device according to claim 1, wherein said table can be tilted through an angle of up to a maximum of 30° in either direction from a position in which the surface of said table is substantially horizontal.

3. A driving practice device according to claim 1, wherein raised edges are provided on said upper surface of the table to define a path along which said movable object can be maneuvered by operation of said steering wheel and said foot-operable levers.

4. A driving practice device according to claim 1, wherein said base comprises at least two releasably engageable parts and wherein parts of the device are releasable from the base.

5. A coordination practice device, comprising:
a base;
a substantially horizontal arm carried by said base for rotation about its longitudinal axis;
a table supported at one end of said arm for tilting about said longitudinal axis of said arm and for rotation about an axis substantially perpendicular to the table and to said longitudinal axis;
a drive shaft supported at the opposite end of said arm to said table, such that pivotal movement of said drive shaft about said longitudinal axis of said arm, in either sense, is transmitted by said arm to tilt the table, said drive shaft being rotatable about its longitudinal axis;
a manually operable wheel carried by said drive shaft such that rotation of said wheel effects rotation of said drive shaft about its longitudinal axis;
a first pulley having a circumferential groove and adapted to be driven to rotate by said drive shaft;
a second pulley incorporated in said table and having a circumferential groove, and
a flexible drive belt engaged in said circumferential grooves in said first and second pulleys, to transmit drive from said first pulley to said second pulley on rotation of said wheel by an operator.

6. A coordination practice device according to claim 5, wherein said table can be tilted through an angle of up to a maximum of 30° in either direction from a position in which the surface of said table is substantially horizonal.

7. A coordination practice device according to claim 5, wherein the table has a flat upper surface and wherein said device includes a movable object which can be placed on said upper surface for sliding or rolling movement along it, operation of the wheel to tilt and rotate the table controlling the speed and direction of movement of said object relative to the surface.

8. A coordination practice device according to claim 7, wherein raised edges are provided on said upper surface of the table to define a path along which said movable object can be maneuvered by manipulation of the wheel.

9. A coordination practice device according to claim 5, wherein said base comprises at least two releasably engageable parts and wherein parts of the device are releasable from the base.

* * * * *